United States Patent
Holtmanns et al.

(10) Patent No.: US 9,781,085 B2
(45) Date of Patent: Oct. 3, 2017

(54) DEVICE TO DEVICE SECURITY USING NAF KEY

(75) Inventors: Silke Holtmanns, Klaukkala (FI); Nadarajah Asokan, Espoo (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/371,683

(22) PCT Filed: Feb. 14, 2012

(86) PCT No.: PCT/IB2012/050675
§ 371 (c)(1),
(2), (4) Date: Jul. 10, 2014

(87) PCT Pub. No.: WO2013/121246
PCT Pub. Date: Aug. 22, 2013

(65) Prior Publication Data
US 2015/0012743 A1 Jan. 8, 2015

(51) Int. Cl.
*H04L 29/06* (2006.01)
*H04W 12/04* (2009.01)
(Continued)

(52) U.S. Cl.
CPC .......... *H04L 63/062* (2013.01); *H04L 9/0866* (2013.01); *H04L 63/0876* (2013.01);
(Continued)

(58) Field of Classification Search
CPC .................................... H04L 9/32; H04L 9/12
(Continued)

(56) References Cited

U.S. PATENT DOCUMENTS 8,509,431 B2 * 8/2013 Schmidt et al. ............... 380/44
8,522,025 B2 * 8/2013 Lakshmeshwar ..... H04L 9/3271
713/170
(Continued)

FOREIGN PATENT DOCUMENTS

EP 1933498 A1 6/2008
WO 2011117677 9/2011

OTHER PUBLICATIONS

International Search Report and Written Opinion received for corresponding Patent Cooperation Treaty Application No. PCT/IB2012/050675, dated Mar. 13, 2013, 14 pages.
(Continued)

*Primary Examiner* — Dede Zecher
*Assistant Examiner* — Dereena Cattungal
(74) *Attorney, Agent, or Firm* — Mintz Levin Cohn Ferris Glovsky and Popeo, P.C.

(57) ABSTRACT

A method, apparatus and computer program product are disclosed for establishing secure off-network communications between first and second Secure Cellular Devices that each have a cellular identity. The second Secure Cellular Device may assume the role of Remote Device for interaction with the NAF keyserver and may obtain a local key. The first Secure Cellular Device may derive the local key and the two devices may conduct secure communications using the shared local key. The two Secure Cellular Devices may alternate the roles of Secure Host and Remote Device, each twice obtaining or deriving a shared local key such that there are two such keys. The devices may employ one key for secure communication in one direction and the other for communication in the other direction. Alternatively, the devices may derive a unique shared key as a function of the two shared keys.

14 Claims, 8 Drawing Sheets

(51) Int. Cl.
*H04L 9/08* (2006.01)
*H04W 4/00* (2009.01)
*H04W 76/02* (2009.01)

(52) U.S. Cl.
CPC ............ *H04W 12/04* (2013.01); *H04L 63/30* (2013.01); *H04W 4/005* (2013.01); *H04W 4/008* (2013.01); *H04W 76/023* (2013.01)

(58) Field of Classification Search
USPC ............................................ 713/167; 380/44
See application file for complete search history.

(56) References Cited

U.S. PATENT DOCUMENTS

| | | | |
|---|---|---|---|
| 2003/0208677 A1 | 11/2003 | Ayyagari et al. | |
| 2006/0205388 A1* | 9/2006 | Semple ............... | H04L 63/0853 455/411 |
| 2006/0218396 A1* | 9/2006 | Laitinen et al. ............... | 713/167 |
| 2007/0101122 A1* | 5/2007 | Guo ..................... | H04L 63/061 713/153 |
| 2007/0160201 A1* | 7/2007 | Blom .................... | H04L 9/0844 380/30 |
| 2007/0234041 A1* | 10/2007 | Lakshmeshwar ..... | H04L 9/3271 713/156 |
| 2007/0240204 A1* | 10/2007 | Somekawa et al. ............. | 726/5 |
| 2008/0095361 A1* | 4/2008 | Wifvesson ............ | H04L 9/0841 380/44 |
| 2008/0127320 A1* | 5/2008 | De Lutiis .......... | H04L 29/12216 726/9 |
| 2008/0130898 A1* | 6/2008 | Holtmanns et al. .......... | 380/278 |
| 2010/0268937 A1* | 10/2010 | Blom .................... | H04L 63/061 713/153 |
| 2011/0016321 A1* | 1/2011 | Sundaram ............. | H04L 63/061 713/171 |
| 2011/0051912 A1* | 3/2011 | Sundaram ............. | H04L 9/0825 379/93.02 |
| 2011/0206206 A1* | 8/2011 | Blom ..................... | H04L 9/083 380/279 |
| 2013/0125226 A1* | 5/2013 | Shah ................... | H04L 63/0815 726/7 |
| 2014/0244994 A1* | 8/2014 | Yu ......................... | H04W 12/04 713/2 |

OTHER PUBLICATIONS

3GPP TS 33.259, v. 10.0.0, Mar. 2011, 3rd Generation Partnership Project; Technical Specification Group Services and System Aspects; Key establishment between a UICC Hosting Device and a Remote Device (Release 10).

"3rd Generation Partnership Project; Technical Specification Group Services and System Aspects; Single Sign on Application Security for Common IMS—Based on SIP Digest (Release 11)", 3GPP TR 33.914, v0.4.0, Apr. 2011, pp. 1-35.

* cited by examiner

DEVICE TO DEVICE SECURITY USING NAF KEY

RELATED APPLICATION

This application was originally filed as PCT Application No. PCT/IB2012/050675 filed Feb. 14, 2012.

TECHNOLOGICAL FIELD

The present invention relates to mobile communications technology, and more particularly to secure off-network communications between devices enabled using an network application function (NAF) key.

BACKGROUND

With the increasing prevalence of smart phones and mobile computing devices having communications capability, many communications networks are becoming overloaded. It is often difficult to establish communication through a wireless network because its resources are completely encumbered by the network load. "Device to device" direct communication can mitigate this problem by offloading what would otherwise be network traffic onto direct communication paths between devices.

This alternative approach raises issues related to communication security. The devices each must authenticate the other with respect to their cellular identities. Any security association (that is, secure key encrypted signaling) between devices must continue to comply with lawful interception requirements.

One technique for creating a secure channel between two devices involves only the two devices that desire to communicate. Normally the devices must be in proximity to one another (such as Bluetooth devices, or connected via universal serial bus (USB) cable, Infrared link or serial cable link). The devices require user interaction, for example inserting a shared secret (e.g., a cryptographic key), handshaking the phones together, or otherwise establishing some type of link between them through user manipulation. These techniques do not satisfy the lawful interception requirement, since the established secret is not available to the lawful interception agencies.

Another technique for creating a secure channel between two devices involves a trusted third party. This technique includes provisioning the devices with shared keys or trust certificates that are accessed and used on demand by the user(s). Communications 3GPP™ Technical Specification TS 33.259 describes using the NAF Key Center but does not specify how the Remote Device and the key center can mutually authenticate each other. TS 33.259 was written with the assumption that the Remote Device would be, for example, a personal computer (PC).

Referring to FIG. 3, an architecture is shown for supporting this technique to establish a secure channel between a universal integrated circuit card (UICC) Hosting Device 40 and a Remote Device 42 connected via a local interface 44 for the purpose of protecting the communication between the devices. The FIG. 3 architecture is that specified in 3GPP™ TS 33.259 (v. 10.0) for key establishment which is incorporated in its entirety as if fully set forth herein.

With continued reference to FIG. 3, the local interface 44 between the UICC Hosting Device 40 and the Remote Device 42 is normally accomplished via a short-range radio frequency (RF) connection (e.g., Bluetooth or infrared (IR)) or a wired link (e.g., USB cable or serial cable). The object of the key security process is to arrive at a local key that both the UICC Hosting 40 and Remote Device 42 share so that they can exchange data securely.

In general, the Remote Device 42 requests parameters from the UICC Hosting Device 40 that are necessary to the ultimate derivation of the shared local key (Ks_local_device) that will facilitate secure communication. These parameters include an NAF-ID and a bootstrap transaction identifier (B-TID). The Remote Device 42 and the NAF Key Center 46 establish a communication link via a secure transport layer security pre-shared key (TLS-PSK) tunnel. The Remote Device 42 sends a request to the NAF Key Center 46 for a shared key (Ks_local_device).

The NAF Key Center 46 calculates the new shared local key using the parameters provided by the Remote Device 42 and returns a message containing the value of the shared local key Ks_local_device and its lifetime. The Remote Device 42 stores the shared local key and sends a message to the UICC Hosting Device 40 that the key has been established. The Remote Device 42 then sends the same parameters to the UICC hosting device 40 that it provided to the NAF Key Center 46 together with the new shared local key lifetime. The shared local key (Ks_local_device) itself is never exchanged between the Remote Device 42 and the UICC device 40.

The UICC Hosting Device 40 uses the parameters from the Remote Device 42 to derive the local shared device key Ks_local_device and store it locally. The UICC Hosting Device 40 signals the Remote Device 42 that the key verification is successful. Secure communication between the two devices proceeds using the shared local key.

Should the Remote Device 42 have no network connectivity so as to access the NAF directly, its communication may be routed through the UICC Hosting device 40 to the NAF 46 ("tethering"). The protocol for deriving the shared local key proceeds as described above.

This protocol assumes that the Remote Device is a personal computer or other computing device. Therefore the protocol does not provide a way for the Remote Device and the NAF key center to mutually authenticate each other, since no technical assumption on the available security mechanisms, e.g. in a PC, could be made during the writing of the standard.

The "UICC hosting device" of FIG. 3 is too narrow a reference for evolving communication devices, which include, for example, mobile (cellular) phones, various computing devices, personal digital assistants (PDAs), notebooks, tablets and the like. Each of these devices may be provided with secure key derivation features, such as, for example, SIM, ISIM, USIM, ICC_ID, C-SIM, RUIM, or SIP Digest mechanism applications (collectively, "security foundation"). These are baseline key derivation features and may be hosted by a UICC, a SIM card, embedded SIM capability, or other forms of secure element (e.g., ARM TrustZone Chip or other secure chip). Even virtualization of the secure element in an existing processor is possible. For these reasons, in the remainder of this description, the "UICC Hosting Device" of FIG. 3 will be replaced by the more generic "Secure Cellular Device" to encompass the broader universe of secure communications devices.

BRIEF SUMMARY

The invention assumes that now that the secondary device, i.e. "Remote Device," is equipped with Network Application Access credentials (i.e. SIM, ISIM, C-SIM, SIP-Digest credentials). Those credentials might be encoded on a removable or embedded UICC. The invention takes into account the fact that there is a security foundation in the "Remote Device" which can be used further to enhance and improve the existing methods.

An example embodiment of the invention provides a mechanism to establish an operator-controlled security association between two devices having a cellular identity and security foundation by extending the NAF Key Server functionality. This security association can be used by lawful interception agencies. The Network Application Function (NAF) is part of the Generic Bootstrapping Architecture (GBA) and GBA provides a shared cryptographic secret between the NAF server and a device.

In a first example embodiment, a method is provided that comprises causing a Secure Cellular Device having a cellular identity to be linked with a communications network application function (NAF) keyserver, causing the cellular identity of the Secure Device to be authenticated with the NAF keyserver, and deriving a first local key for secure off-network communications. The method may further comprise using the first local key for conducting secure off-network communications with another Secure Cellular Device, causing a bootstrap identification and an external key to be provided to the NAF keyserver, and causing a tethering function to be provided for linking a Remote Device to the NAF keyserver. The method may also comprise assuming a function of a Remote Device for network authentication, including causing a bootstrap identification and an external key to be provided to an NAF keyserver, and receiving a second local key from the NAF keyserver for secure off-network communication, causing a link to be established as Remote Device with the network keyserver through a secure tunnel, and using a first key for communication in one direction with another device and a second key for communication in another direction with the other device, or deriving a unique key as a function of the first and second keys for secure off-network communication.

In another example embodiment, an apparatus is provided that includes at least one processor and at least one memory including computer program code, the at least one memory and one computer program code configured to, with the at least one processor cause the apparatus to at least cause a Secure Cellular Device having a cellular identity to be linked with a communications network application function (NAF) keyserver, cause the cellular identity of the UICC device to be authenticated with the NAF keyserver, and derive a first local key for secure off-network communications. The apparatus may be further configured to use the local key for conducting secure off-network communications with another Secure Cellular Device, execute the function of Remote Device having cellular identity, cause a link to be established with the NAF keyserver through a secure tunnel. The apparatus may be further configured to authenticate its remote cellular identity with the NAF keyserver, receive a second local key from the NAF keyserver for secure off-network communication, employ the first and second local keys in bidirectional secure off-network communication, and use the first key for communication in a first direction and the second local key for communication in a second direction, or derive a unique local key as a function of the first and second local keys.

In yet another embodiment, a computer program product is provided that includes at least one non-transitory computer-readable storage medium having executable computer-readable program code instructions stored therein, the computer-readable program code instructions configured to cause a Secure Cellular Device having cellular identity to link with a communications network application function (NAF) keyserver, cause the cellular identity to be authenticated with the NAF keyserver, and derive a first local key for secure off-network communications. The computer program product program instructions may be further configured to use the first local key for conducting secure off-network communications with another Secure Cellular Device, cause bootstrap identification and an external key to be provided to the NAF keyserver, and cause a tethering function to be provided for linking a Remote Device to the NAF keyserver. Further instructions may be configured to cause the Secure Cellular Device to assume a function of a Remote Device for network authentication, cause a bootstrap identification and an external key to be provided to an NAF keyserver, receive a second local key from the NAF keyserver for secure off-network communication, and cause a link to be established with the network keyserver through a secure tunnel. The program instructions may be further configured to use a first key for communication in one direction with another device and a second key for communication in a second direction with the other device, or derive a unique key as a function of the first and second keys for secure off-network communication.

In another example embodiment, an apparatus is provided that includes means, such as a processor and communications interface, for causing a Secure Cellular Device having cellular identity to be linked with a communications network application function (NAF) keyserver, means for causing the cellular identity of the Device to be authenticated with the NAF keyserver, and means for deriving a first local key for secure off-network communications and may further include means, such as a communications interface, for using the first local key to conduct secure off-network communications with another Secure Cellular Device, means for providing a Secure Cellular Device bootstrap identification and an external key to the NAF keyserver, and means for tethering a Remote Device to a link to the NAF keyserver. Further embodiments may include means, such as a processor, memory, and computer program code instructions, for assuming a function of a Remote Device for network authentication, means causing a bootstrap identification and an external key to be provided to an NAF keyserver, and means for receiving a second local key from the NAF keyserver for secure off-network communication. Further embodiments may include means for using the first key for communication in one direction and the second key for communication in the second direction, or means for deriving a unique key as a function of the first and second keys for secure off-network communication.

BRIEF DESCRIPTION OF THE DRAWINGS

Figure 1:
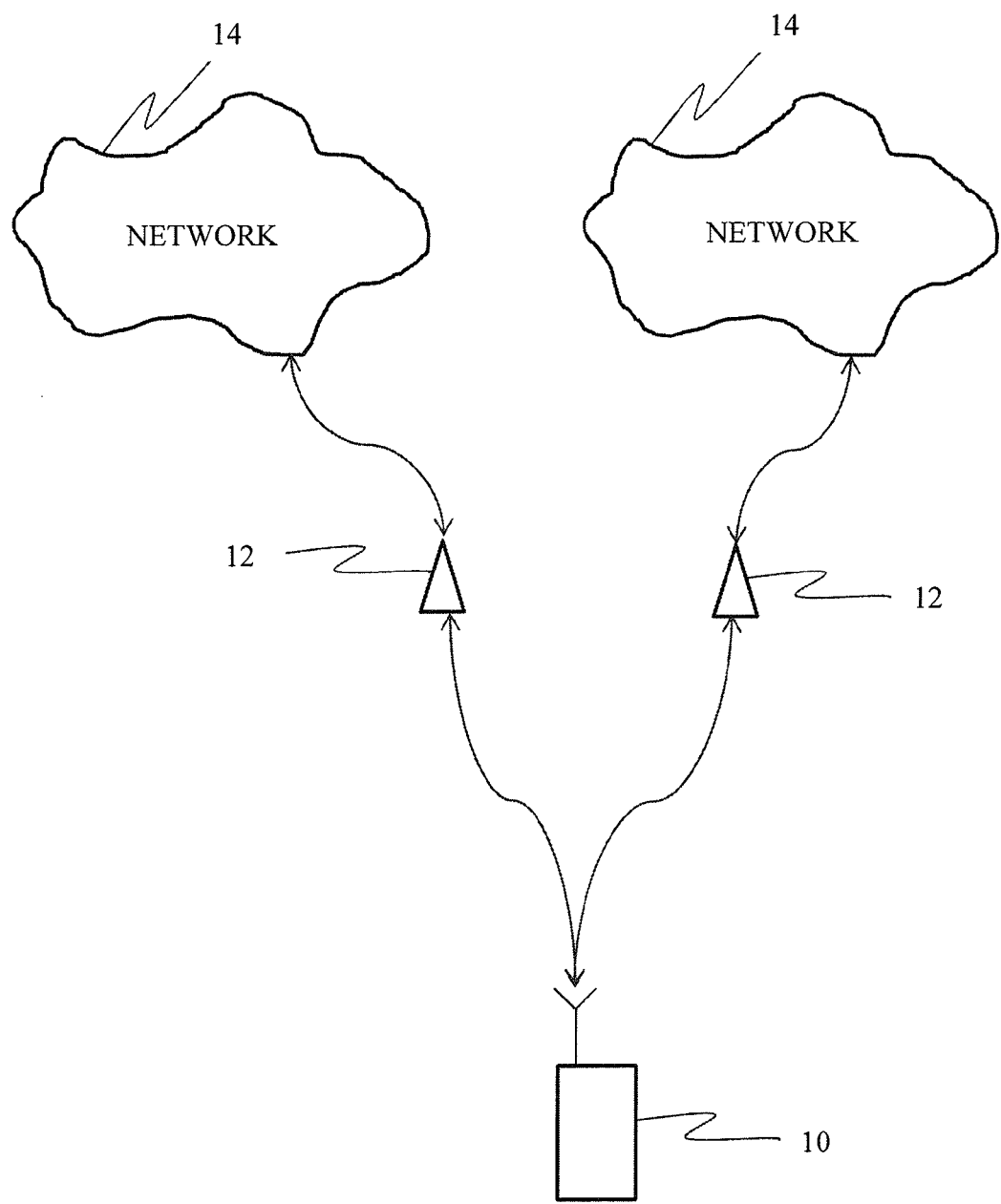
Figure 2:
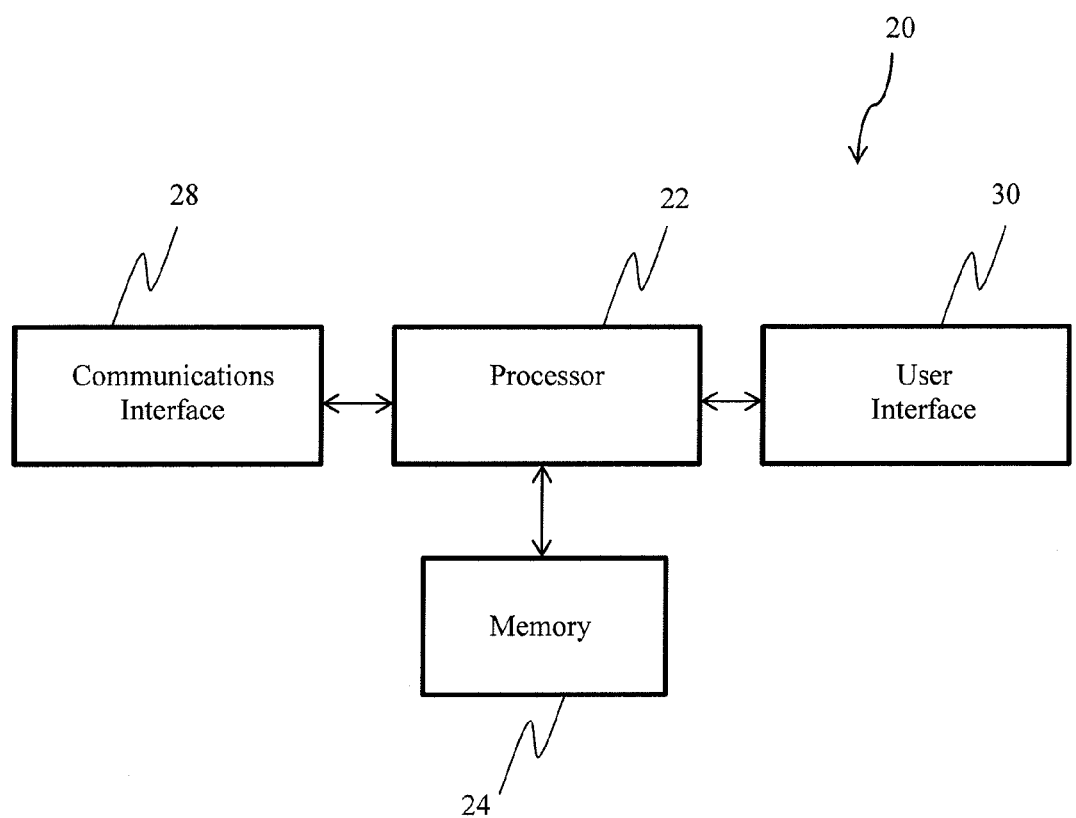
Figure 3:
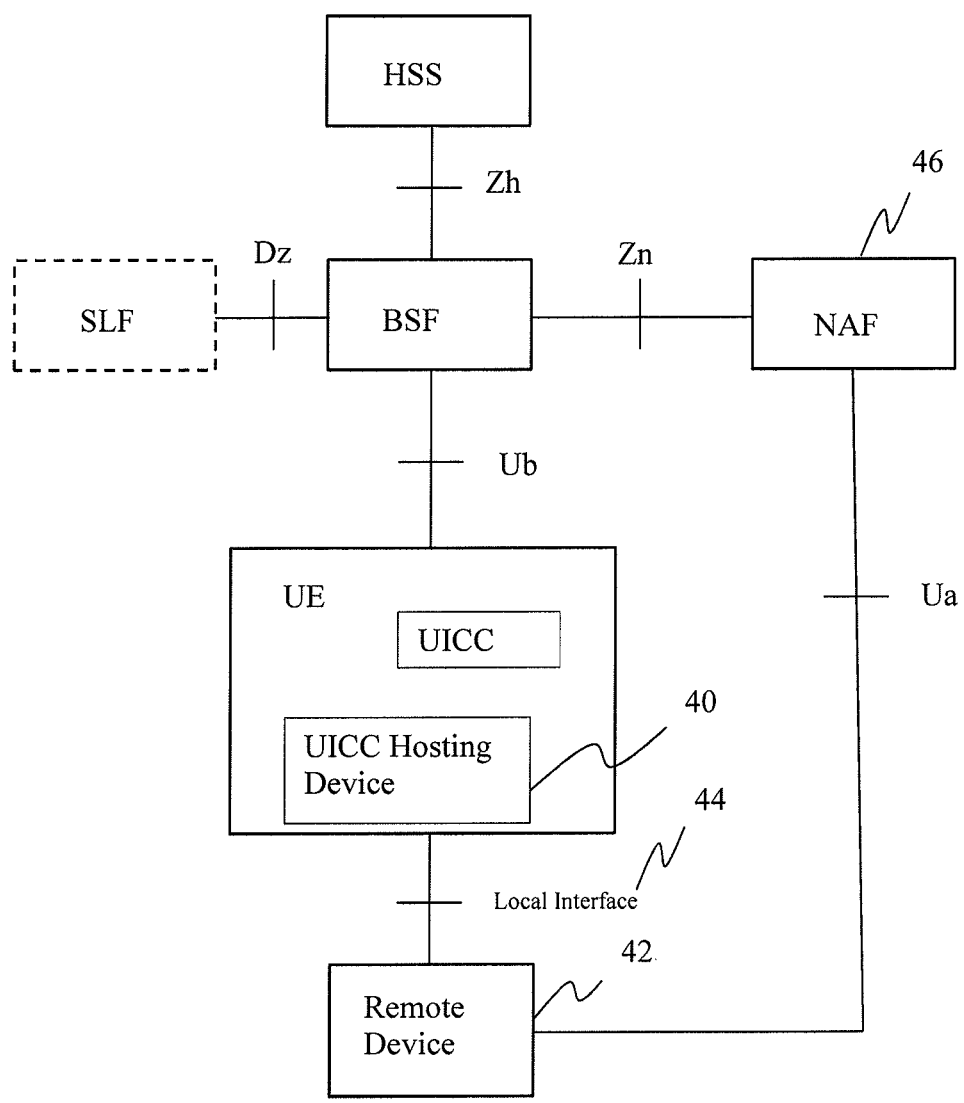
Figure 4:
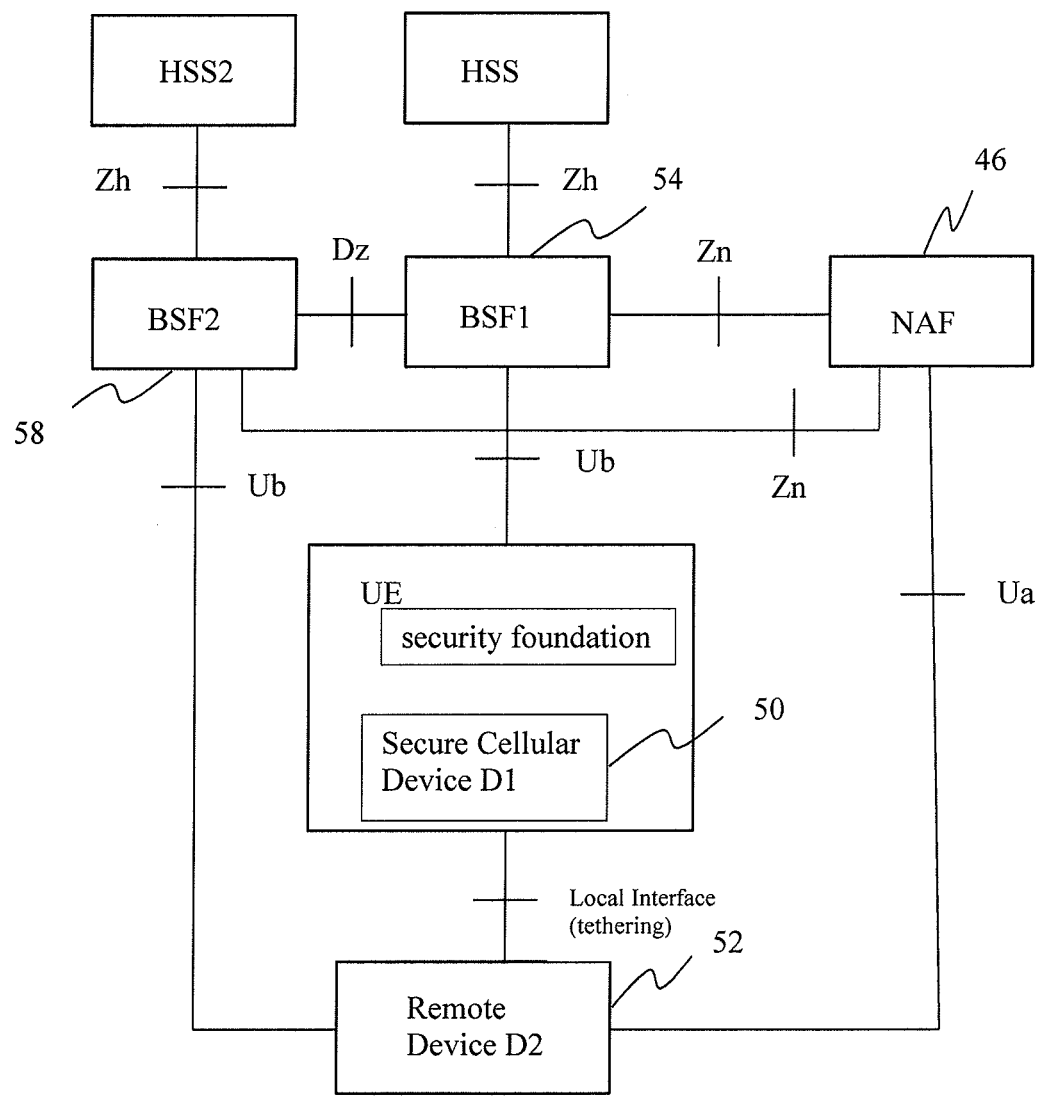
Figure 5:
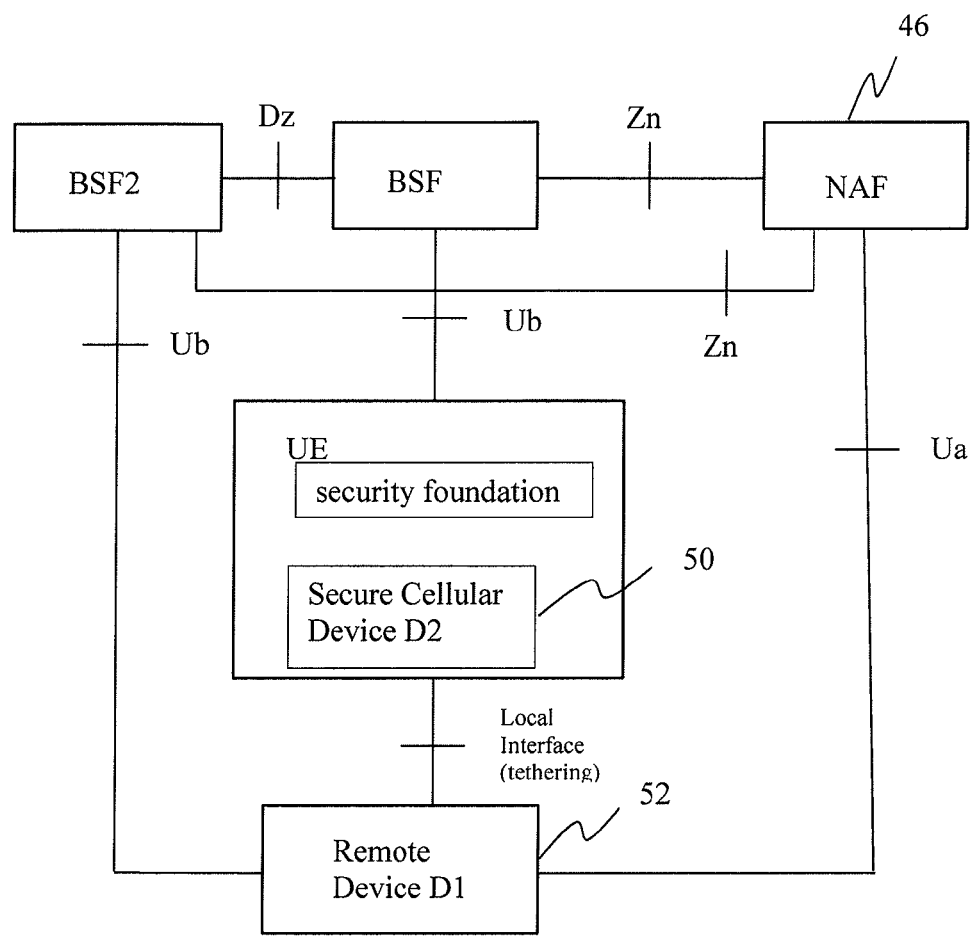
Figure 6:
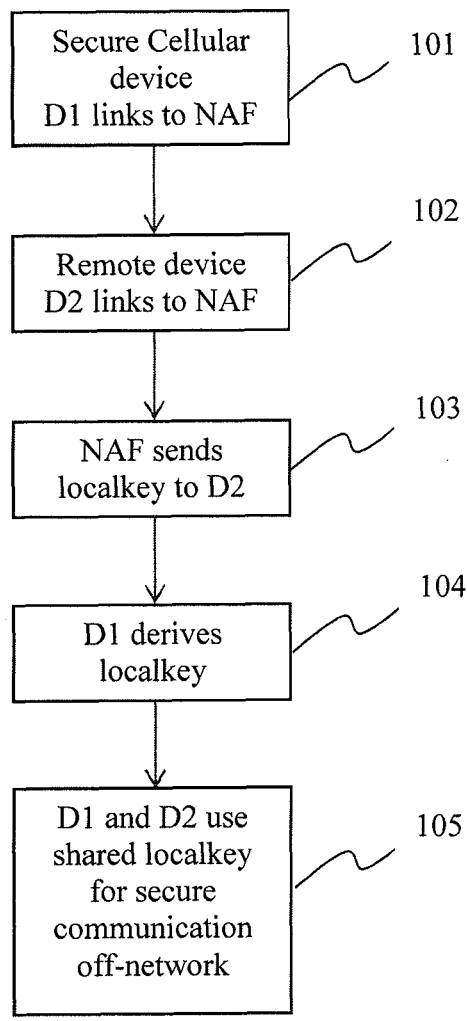
Figure 7:
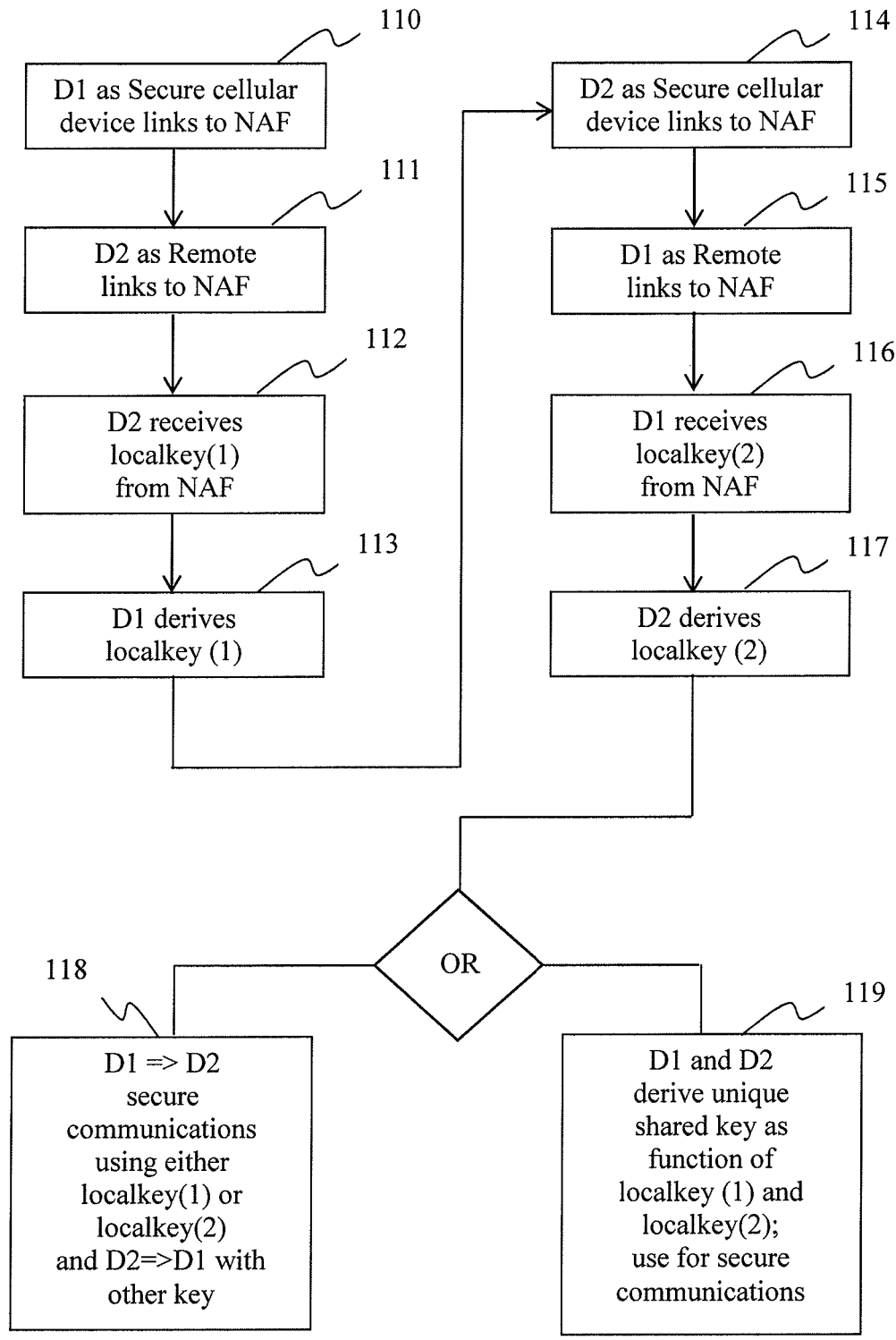
Figure 8:
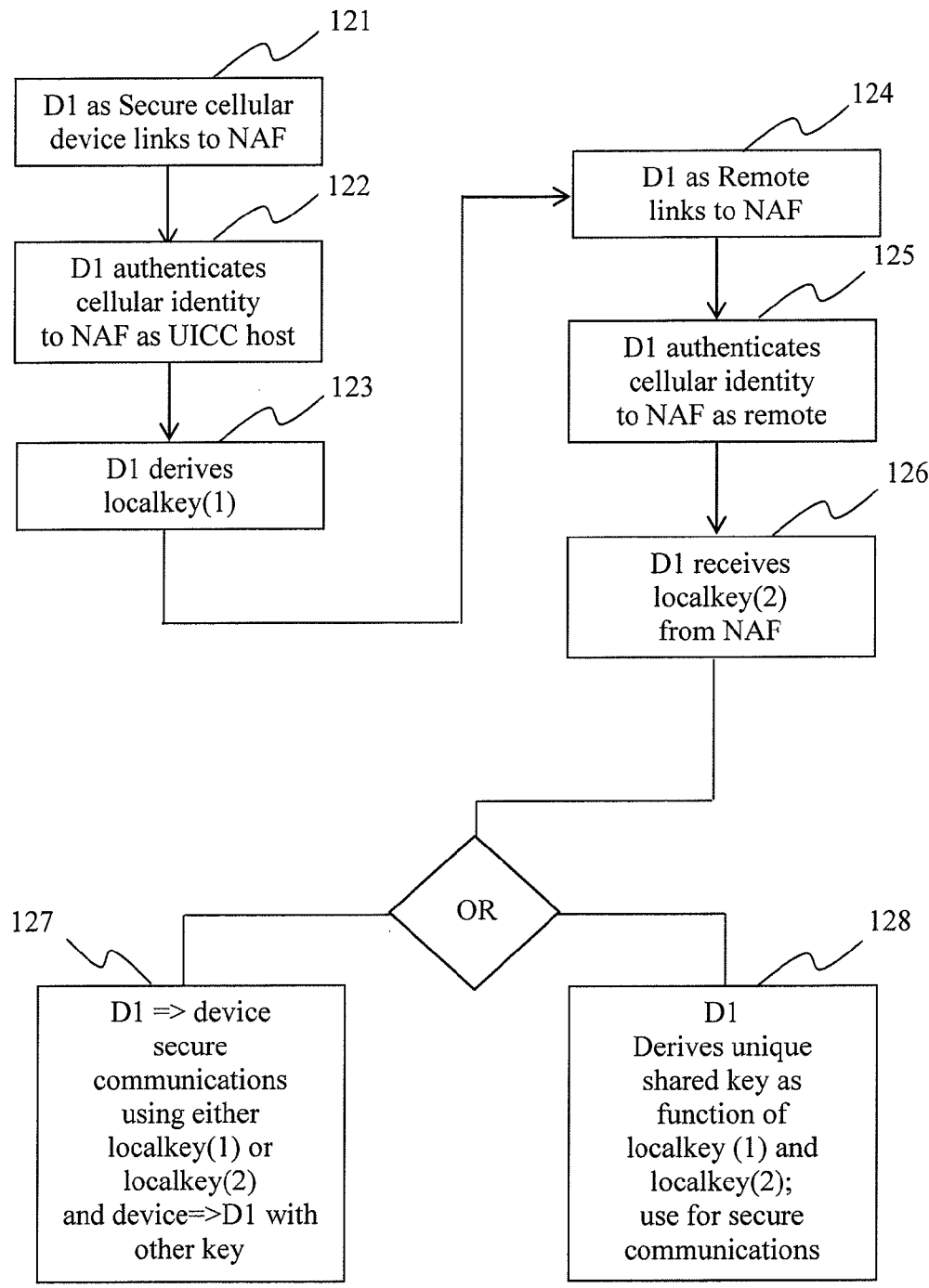

Having thus described certain embodiments of the invention in general terms, reference will now be made to the accompanying drawings, which are not necessarily drawn to scale, and wherein:

FIG. 1 is a schematic representation of a system in which a mobile terminal may communicate with a plurality of networks in accordance with an example embodiment of the present invention;

FIG. 2 is a block diagram of an apparatus from the perspective of a mobile terminal that may be specifically configured to perform the operations of an example embodiment of the present invention;

FIG. 3 is a block diagram illustrating the TS 33.259 key protocol for a Secure Cellular Device and a Remote Device;

FIG. 4 is a block diagram illustrating the shared key establishment process of an example embodiment of the invention for two devices;

FIG. 5 is a block diagram illustrating an alternative embodiment of a shared key establishment process for two Secure Cellular Devices;

FIG. 6 is a flow diagram of an example embodiment of a method of the invention;

FIG. 7 is a flow diagram of an example embodiment of a method of the invention; and FIG. 8 is a flow diagram of an example embodiment of a method of the invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Referring now to FIG. 1, mobile terminals 10 may communicate with a network 14 utilizing an uplink from the mobile terminal 10 to the network 14 and a downlink from the network 14 to the mobile terminal. The mobile terminals 10 may be of various types of mobile communication devices such as, for example, mobile telephones, personal digital assistants (PDAs), pagers, laptop computers, or any of numerous other hand held or portable communication devices, computation devices, content generation devices, content consumption devices, or combinations thereof, generally termed "user equipment" (UE). The mobile terminal 10 may communicate with a network via an access point 12, such as a Node B, an evolved Node B (eNB), a base station or the like, each of which comprises a radio frequency transmitter and receiver. The mobile terminal 10 may communicate with various types of networks 14 including, for example, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network, a Universal Terrestrial Radio Access Network (UTRAN), a GSM Edge Radio Access Network (GERAN) or other type of network.

Referring now to FIG. 2, an apparatus 20 that may be embodied by or otherwise associated with a mobile terminal 10 may include or otherwise be in communication with a processor 22, a memory device 24, a communication interface 28, and a user interface 30.

In some example embodiments, the processor 22 (and/or co-processors or any other processing circuitry assisting or otherwise associated with the processor) may be in communication with the memory device 24 via a bus for passing information among components of the apparatus 20. The memory device 24 may include, for example, one or more non-transitory volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device 24 could be configured to store instructions for execution by the processor 22.

The apparatus 20 may, in some embodiments, be embodied by a mobile terminal 10. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 20 is embodied as a mobile terminal 10, the processor may be embodied by the processor of the mobile terminal.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal 10) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 28 may be any means such as a device or circuitry embodied in either hardware or a combination of hardware and software that is configured to receive and/or transmit data from/to a network 12 and/or any other device or module in communication with the apparatus 20. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In order to support multiple active connections simultaneously, such as in conjunction with a digital super directional array (DSDA) device, the communications interface of one embodiment may include a plurality of cellular radios, such as a plurality of radio front ends and a plurality of base band chains. In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, such as instances in which the apparatus 20 is embodied by a mobile terminal 10, the apparatus may include a user interface 30 that may, in turn, be in communication with the processor 22 to receive an indication of a user input and/or to cause provision of an audible, visual, mechanical or other output to the user. As such, the user interface may include, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device and/or the like).

Referring to FIG. 4, there is shown a representative block diagram of the relation of the elements in a configuration where two Secure cellular devices, D1 and D2, derive a shared key (Ks_local_device) for secure communication. FIG. 4 shows that the basic architecture for obtaining a shared local key described in relation to FIG. 3 is preserved. In this first aspect of the invention, one of the devices functions as the Secure Cellular Device 50 and the other functions as the Remote Device 52, ignoring its hosting capability for the purpose of obtaining a secure shared key. In FIG. 4, D1 is the Secure Cellular Device 50 and D2 serves as the Remote Device 52.

The FIG. 4 illustration illustrates the interaction of two apparatuses such as that shown in FIG. 2, wherein each apparatus 20, embodied by D1 or D2 in FIG. 4, may include means such as a processor 22, a communications interface 28, and memory 24 for establishing secure communication. In the FIG. 4 embodiment, the protocol for establishing secure communication proceeds with the D1 processor 22 bootstrapping with its own Bootstrap Function BSF1 54 to obtain a Bootstrap Identification B-TID1 and derives an external key Ks_NAF1/Ks_ext_NAF1 to be used with the keyserver NAF 46 through its communication interface 28.

The processor 22 of D2 performs the same function through BSF2 58 and obtains B-TID2 and Ks_NAF2/Ks_ext_NAF2 to use with the keyserver NAF 46 through its communications interface 28. D2 causes a TLS-PSK (or other form of secure mode) tunnel (hereafter a "secure tunnel") to be established with the keyserver NAF 46 using Ks_NAF2/Ks_ext_NAF2. The keyserver NAF 46 derives Ks_local_device using Ks_NAF1/Kx_ext_NAF1 from D1 as the input parameter "key". The keyserver NAF 46 uses B-TID1 as the input parameter "P1" and IMSI2 as input parameter "P0" (rather than "device_ID"). The keyserver NAF 46 sends Ks_local_device to D2 via the secure tunnel and the communications interface 28 of D2. Ks_local_device is retained in a memory 24 of D2. If for some reason D2 does not have network connectivity, D1 can provide processor 22 and communications interface 28 resources for "tethering" by routing D2's communication to network servers.

Using means such as its processor 22, D1 proceeds to derive Ks_local_device on its own as illustrated and described in the process of FIG. 3 (Background, above) and retains Ks_local_device in a memory 24. Once that occurs, D1 and D2 have the same shared key and can employ Ks_local_device to protect communication between them.

In a second embodiment and referring to FIGS. 4 and 5, each apparatus 20 D1 and D2, again using means such as a processor 22, communications interface 28 and memory 24, for establishing secure communication, assumes the roles of Secure Cellular Device and Remote Device in turn and obtain two local shared keys for securing their device-to-device communication. D1 runs the protocol twice, first as the Secure Cellular Device 50 (FIG. 4) during which it computes Ks_local_device1, then as the Remote Device 52 (FIG. 5) during which it authenticates itself to the keyserver NAF 46 using its Ks_NAF2 through a secure tunnel and receives Ks_local_device2 from the NAF 46 after successful authentication. D2 runs the same protocols twice for itself in the alternate roles of Secure Cellular Device 50 (FIG. 5) and Remote Device 52 (FIG. 4) such that both D1 and D2 come to possess Ks_local_device1 and Ks_local_device2, two shared keys.

Having both shared keys in each device enables the D1 and D2 apparatuses to proceed in one of two ways. First, they may employ each key for one direction of communication. For example, they may use Ks_local_device1 for messages from D1=>D2 and Ks_local_device2 for messages from D2=>D1. Alternatively, each may employ the key derivation capability of the security foundation in each device to derive a new shared key as a function of the two shared keys Ks_local_device1 and Ks_local_device2 wherein the lifetime of the new shared key is the shorter of the two key lifetimes.

This suggests that in a third embodiment, the devices may operate in accordance with either FIG. 4 or FIG. 5 and then use the resulting shared local key to agree upon a new key that is used to secure communication between them. However, this would not satisfy the lawful intercept requirement.

FIGS. 6 and 7 illustrate flowcharts of the key acquisition processes described herein as example embodiments of the invention. FIG. 6 is shown in the context of two apparatus 20 (FIG. 2) having means such as a processor 20, communications interface 28 and memory 24, embodied by Secure Cellular Devices D1 and D2 that seek to communicate securely off-network by establishing a secure channel. D1 as Secure Cellular Device links 101 to the NAF keyserver, supplying parameters that are necessary to key generation by the NAF keyserver. D2 as the Remote Device also links 102 to the NAF keyserver to obtain a local key to share with D1, which is delivered 103 by the keyserver to D2. Once D2 has the local key, D1 derives the key itself 104. D1 and D2 may use 105 the shared local key (Ks_local_device) for secure off-network communication.

FIG. 7 illustrates an example embodiment of a protocol for deriving two shared keys for off-network secure communication between two Secure Cellular Devices. In two sequences, the two devices alternate with each other in the roles of secure host and Remote Device. For example, D1 assumes the role of Secure host 110 and links to the NAF keyserver. D2 becomes 111 the Remote Device and also links to the NAF and receives a first local key (localkey(1)) 112 from the NAF keyserver. D1 then derives 113 localkey (1). The protocol continues with D2 assuming 114 the role of Secure host device and links to the NAF keyserver. D1 changes to become 115 Remote Device and also links to NAF keyserver. The NAF keyserver returns 116 localkey(2) to D1 while D2 proceeds to derive 117 localkey(2). With both devices now possessing both localkey(1) and localkey(2) they may communicate in one of two ways. They may use one of the keys for secure communication in one direction and the other key for the other direction 118. Or they may derive 119 a unique shared local key as a function of localkey(1) and localkey(2) and use the unique key for secure off-network communication.

Referring to FIG. 8 there is shown a flow diagram of an example embodiment of the protocol from the perspective of a single Secure Cellular Device D1. D1 links 121 to the NAF keyserver as Secure host. Authentication of D1's cellular identity 122 to the NAF follows. After authentication, D1 derives 123 a first local key. At this point, D1 could engage in secure off-network communications with another device configured as a Remote Device that had obtained the same key from the NAF keyserver in tandem with D1. However, D1 may continue by assuming 124 the role of Remote Device and link to the NAF as such. In this role, D1 again authenticates 125 its cellular identity to NAF, this time as a Remote Device. NAF sends 126 a second local key to D1. At this point D1 is in possession of two local keys that it may share with another Secure Cellular Device that has conducted the same authentication and local key process in tandem with D1. Having two local keys, D1 may conduct 127 secure communication with another device sharing the same keys, using one key for one direction of communication and the other key for the other direction. Alternatively, D1 (and the other device) may derive 128 a unique key as a function of the two local keys (localkey(1) and localkey (2)) that it possesses. The unique local key could be shared with a second device that has similarly derived the same key for secure off-network communication.

As described above, FIGS. 6, 7 and 8 illustrate flowcharts of an apparatus, method, and computer program product from the perspectives of a mobile terminal and a network entity, respectively, according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a non-transitory memory device of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a non-transitory computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, including those in FIGS. 6, 7 and 8, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodi- That which is claimed:

1. A method comprising:
causing a first secure device having a cellular identity to be linked with a communications network application function keyserver;
causing the cellular identity of the first secure device to be authenticated with the communications network application function keyserver;
causing a second secure device to be linked with the communications network application function keyserver;
causing the second secure device to be authenticated with the communications network application function keyserver;
transmitting, from the communication network application function keyserver and to the first secure device, a first local key and a second local key, the first local key provided in a first mode of the first secure device and the second local key provided in a second mode of the first secure device, the second mode different from the first mode;
transmitting, from the communication network application function keyserver and to the second secure device, the first local key and the second local key, the first local key provided in the first mode of the second secure device and the second local key provided in the second mode of the second secure device;
deriving, at the first secure device and at the second secure device, a shared key derived based on the first local key and the second local key; and
using the shared key for conducting secure off-network two-way communications between the first secure device and the second secure device.

2. The method of claim 1, further comprising:
causing a bootstrap identification and an external key to be provided to the communications network application function keyserver.

3. The method claim 1, further comprising:
causing a tethering function to be provided, at the first secure device, for linking the second secure device to the communications network application function keyserver.

4. The method of claim 1, further comprising:
causing the second secure device to assume a function of a remote device for network authentication, including causing a bootstrap identification and an external key to be provided to the communications network application function keyserver.

5. The method of claim 4, further comprising:
causing a link to be established at the remote device with the communications network application function keyserver through a secure tunnel.

6. An apparatus comprising at least one processor and at least one memory including computer program code, the at least one memory and computer program code configured to, with the at least one processor, cause the apparatus to at least:
cause a first secure device having a cellular identity to be linked with a communications network application function keyserver;
cause the cellular identity of the first secure device to be authenticated with the communications network application function keyserver;
cause a second secure device to be linked with the communications network application function keyserver;
cause the second secure device to be authenticated with the communications network application function keyserver;
transmit, from the communications network application function keyserver and to the first secure device, a first local key and a second local key, the first local key provided in a first mode of the first secure device and the second local key provided in a second mode of the second secure device, the second mode different from the first mode;
transmit, from the communications network application function keyserver and to the second secure device, the first local key and the second local key, the first local key provided in the first mode of the second secure device and the second local key provided in the second mode of the second secure device;
derive, at the first secure device and at the second secure device, a shared key derived based on the first local key and the second local key; and
use the shared key for conducting secure off-network two-way communications between the first secure device and the second secure device.

7. The apparatus of claim 6, wherein the apparatus is further caused to at least: cause the second secure device to execute a function of a remote device having a cellular identity.

8. The apparatus of claim 7, wherein the apparatus is further caused to at least: cause a link to be established with the communications network application function keyserver through a transport layer security pre-shared key tunnel.

9. The apparatus of claim 7, wherein the apparatus is further caused to at least: authenticate a cellular identity for the apparatus with the communications network application function keyserver.

10. The apparatus of claim 6, wherein the apparatus is further caused to at least: employ the first local key and the second local key in bidirectional secure off-network communication between the first secure device and the second secure device.

11. The apparatus of claim 6, wherein deriving the shared key includes deriving the shared key as a function of the first local key and the second local key.

12. A computer program product comprising at least one non-transitory computer-readable storage medium having executable computer-readable program code instructions stored therein, the computer-readable program code instructions configured to:
cause a first secure device having cellular identity to be linked with a communications network application function keyserver;
cause the cellular identity to be authenticated with the communications network application function keyserver;

cause a second secure device to be linked with the communications network application function keyserver;

cause the second secure device to be authenticated with the communications network application function keyserver;

transmit, from the communications network application function keyserver and to the first secure device, a first local key and a second local key, the first local key provided in a first mode of the first secure device and the second local key provided in a second mode of the second secure device, the second mode different from the first mode;

transmit, from the communications network application function keyserver and to the second secure device, the first local key and the second local key, the first local key provided in the first mode of the second secure device and the second local key provided in the second mode of the second secure device;

derive, at the first secure device and at the second secure device, a shared key derived based on the first local key and the second local key; and use the shared key for conducting secure off-network two-way communications between the first secure device and the second secure device.

13. The computer program product of claim 12, wherein the computer-readable program instructions are further configured to:

cause a tethering function to be provided for linking the second secure device acting as a remote device to the communications network application function keyserver.

14. The computer program product of claim 12, wherein the computer-readable program instructions are further configured to:

cause the first secure device to assume a function of a remote device for network authentication; and cause a bootstrap identification and an external key to be provided to the communications network application function keyserver.

* * * * *